Figure 1:
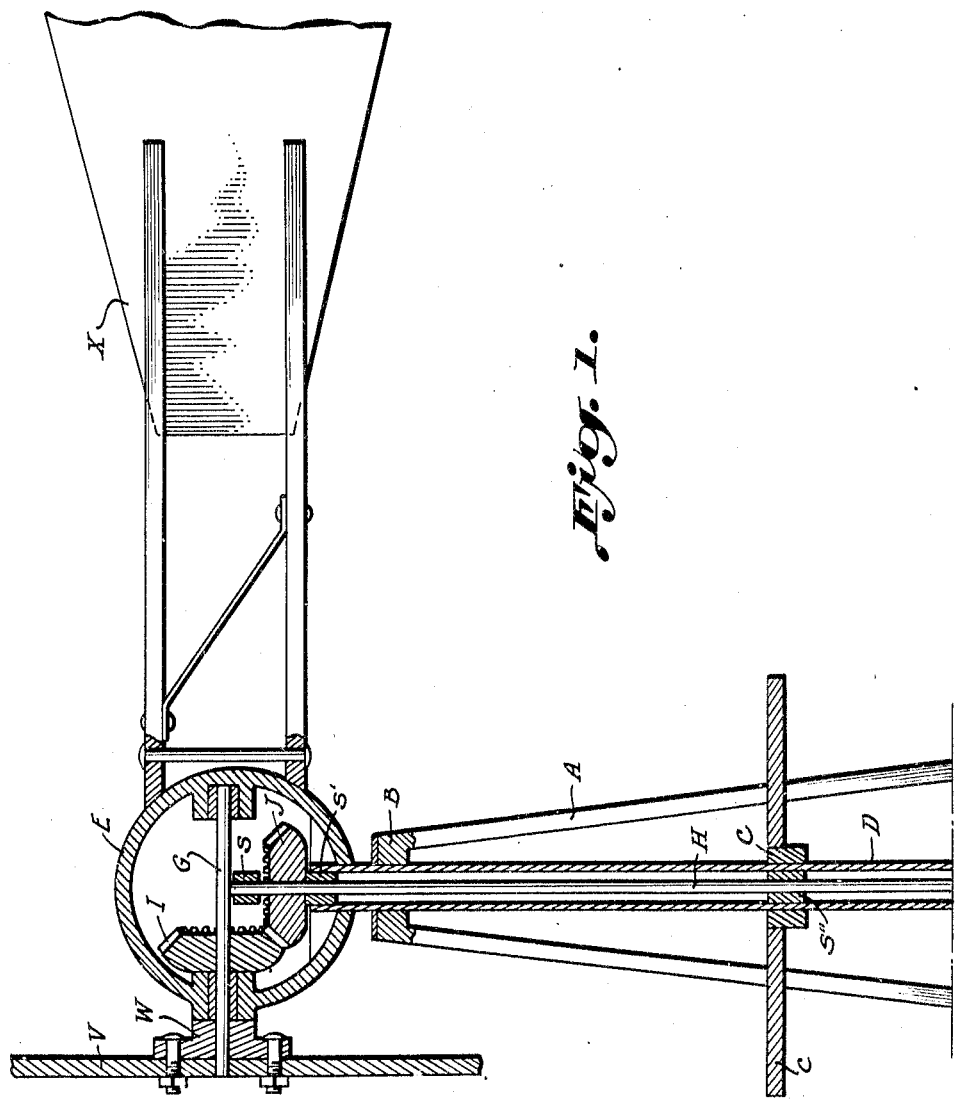

Sept. 7, 1943.   H. SKREBERG   2,329,089
WIND-DRIVEN ELECTRIC GENERATOR
Filed Sept. 18, 1942   2 Sheets-Sheet 1

Inventor:
Hans Skreberg

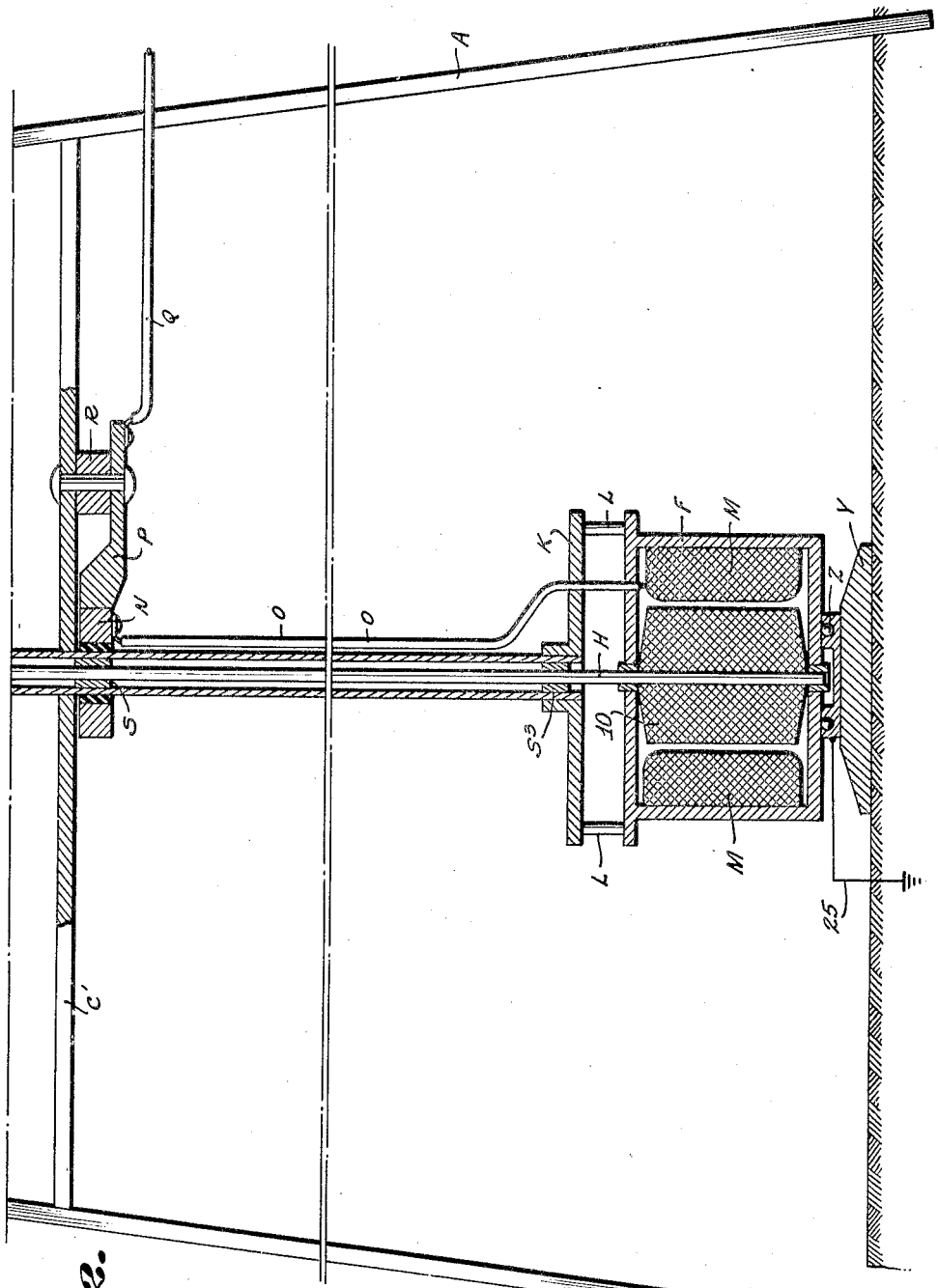

Patented Sept. 7, 1943

2,329,089

UNITED STATES PATENT OFFICE 2,329,089

WIND-DRIVEN ELECTRIC GENERATOR

Hans Skreberg, Big Bend Township, Chippewa County, Minn.

Application September 13, 1942, Serial No. 458,817

1 Claim. (Cl. 290—55)

My present invention relates to electric generators that are wind-driven, particularly to a wind-driven electric generator of large output.

An electric generator of the wind-driven type of my design and construction, it is believed, departs from all conventional designs in that the generator rests not on the top of the tower but on an anti-friction bearing on a floor or pit at the bottom of tower hence tower is relieved of all the weight of the generator and at the same time no climbing of tower is necessary to service the generator.

The drawings in Fig. 1, and in Fig. 2, show the invention in vertical cross section and is believed to fully disclose the same so that those skilled in the art to which the invention appertains may from the drawings, in connection with this specification, make and use the same.

In Fig. 1 in the drawings A is the upper sections of a tower (A in Fig. 2 shows the lower section of a tower) B the cap or top tower casting, C bearing for a vertical tubular member D, C' cross tower members for supporting bearing C.

The vertical tubular member D carries a case E at its top and at its lower end connects with generator case or housing F by means of a plate K connected with upper face of generator case E by means of a series of studs L.

Case E, which is preferably grease-tight, carries a vertical shaft H which at the upper end has a gear J and at lower end is connected with armature shaft H' of generator.

Case E carries a horizontal shaft G provided with a gear I that forms the drive gear for gear J. The extreme end of this shaft G extends outside of case E and carries a wind wheel or propeller V, the wind wheel or propeller hub being designated as W.

Case E is provided with a tail vane X and this tail vane X may be either rigidly or hingedly connected with said case E, depending on what type wind wheel or propeller, means for closing and regulating the said wind wheel or propeller is employed.

In Fig. 2 of the drawings is shown the floor mounted base Y, the anti-friction generator bearing and support Z. Field coils of generator M, insulation for brush is N, brush (positive lead) is P, positive lead cable is O. R is pivot or support for brush P. Q is lead or wire from brush P to power line. The "ground" or negative lead from generator is designated as 25.

Just as the vertical tube D must be provided with a series of outside bearings C, the shaft H must be provided with a series of bearings S mounted inside the tube D.

In both the case E and below each of the bearings S felt washers are provided to prevent leak of lubricant.

As will be readily understood from the drawings the object of the base Y and the bearing Z is to form a support and pivotal means for the vertical generator; the tube D connecting with case E eliminates all torque that naturally arises from drives comprising mitre or bevel gears, as generator case F and propeller-carrying case E, being rigidly connected to each other must turn in unison.

(In the drawings the commutator and brush assembly of the generator or dynamo has been left out it being assumed that the armature 10 and the field coils M suffice to fully disclose the invention.)

As many kinds of wind wheels, propellers, speed regulation means, etc., have application to my present invention what I claim is:

A wind-driven electric generator having a supporting base at or near the ground level of a tower, said base placed centrally inside but independent from the tower, a bearing mounted on top face of said base, the bottom face of the case of a vertical electric generator resting on and adapted to rotate on said bearing, upper face of case of said generator having a plurality of studs, a flange secured to said studs spacing plate a distance above top face of generator case, a tube secured to said flange and extending upwards and slightly above the extreme top end of a tower and secured to a case carrying a propeller rotating on a horizontal shaft, said propeller shaft engaging by bevel or mitre gears a vertical shaft, said shaft connecting with the upper end of generator armature shaft by means of coupling placed between top face of generator case and flange attached to generator case.

HANS SKREBERG.